Figure 1:
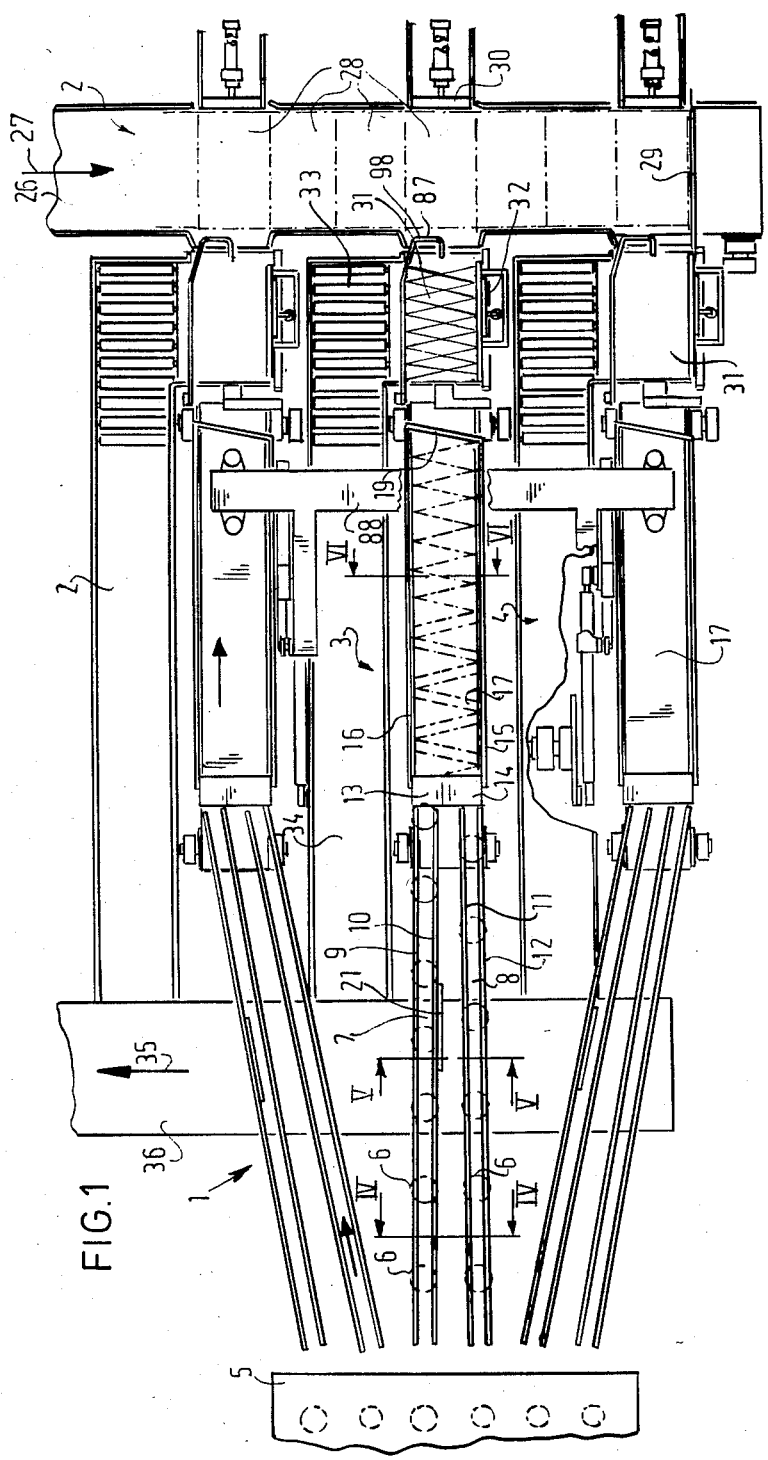

United States Patent [19]  
Dijkman

[11] Patent Number: 4,555,892  
[45] Date of Patent: Dec. 3, 1985

[54] APPARATUS FOR PLACING CONES IN A BOX

[75] Inventor: Berend J. Dijkman, Deventer, Netherlands

[73] Assignee: Thomassen & Drijver-Verblifa N.V., Deventer, Netherlands

[21] Appl. No.: 555,405

[22] Filed: Nov. 28, 1983

[30] Foreign Application Priority Data

Nov. 30, 1982 [NL] Netherlands ................. 8204648

[51] Int. Cl.⁴ ............... B65B 5/08; B65B 35/44; B65B 35/50; B65B 35/56
[52] U.S. Cl. .................................. 53/142; 53/154; 53/247; 53/537; 198/374; 414/31
[58] Field of Search ........... 53/142, 143, 144, 154, 53/244, 247, 255, 446, 537, 544, 594; 198/389, 374, 448, 451; 414/817, 30, 31, 105

[56] References Cited  
U.S. PATENT DOCUMENTS 3,224,552 12/1965 McNeill ..................... 198/389  
3,859,772 1/1975 Thierion ..................... 53/537  
3,878,665 4/1975 Couten ....................... 53/143

FOREIGN PATENT DOCUMENTS 1231613 12/1966 Fed. Rep. of Germany .  
WO82/03209 9/1982 PCT Int'l Appl. .  
393186 10/1965 Switzerland .

Primary Examiner—Robert L. Spruill  
Assistant Examiner—Richard M. Mudd  
Attorney, Agent, or Firm—John P. Snyder

[57] ABSTRACT

The high density packaging of generally conical articles is effected by mechanism which feeds two rows of the suspended articles onto a conveyor so that the articles lie on their sides in a single horizontal row arrangement aligned in spaced relation along the path of travel imparted by the conveyor. This arrangement is such that the articles lie in head-to-toe relation. At a downstream region, the progress of the articles is arrested so that they sequentially crowd into touching relation define a contiguous sequence. Transfer mechanism transfer a group of articles from the sequence as a layer and deposits the layer in a receptacle. The transfer mechanism then transfers a second group in the receptacle as a layer nested with the first layer. To achieve high density, the second group of articles has an orientation relative to the sequence which is different from that of the first group.

18 Claims, 9 Drawing Figures

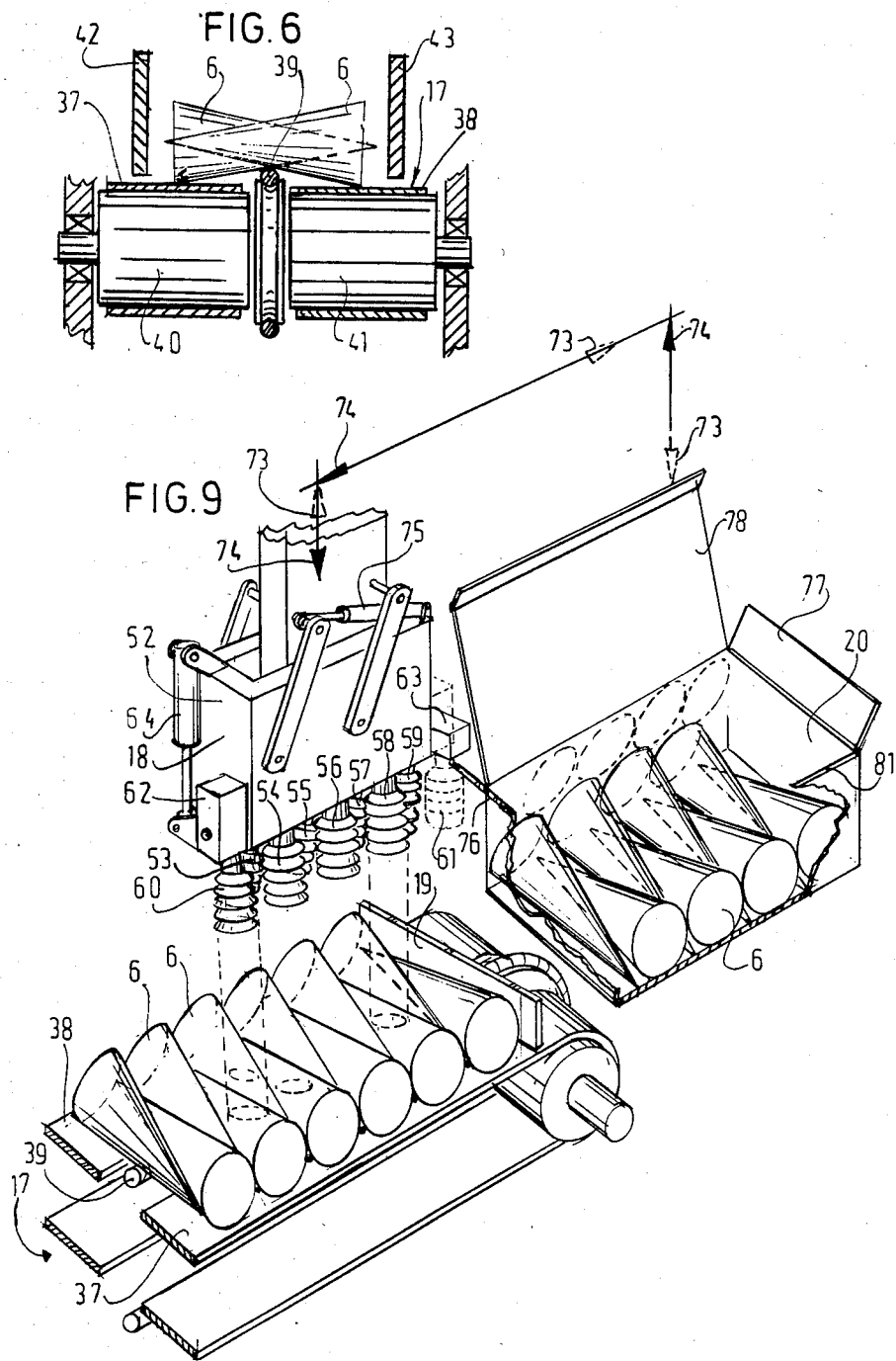

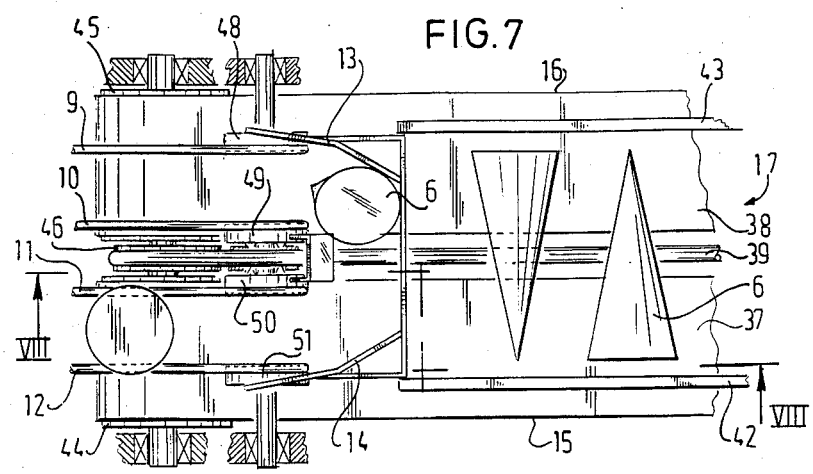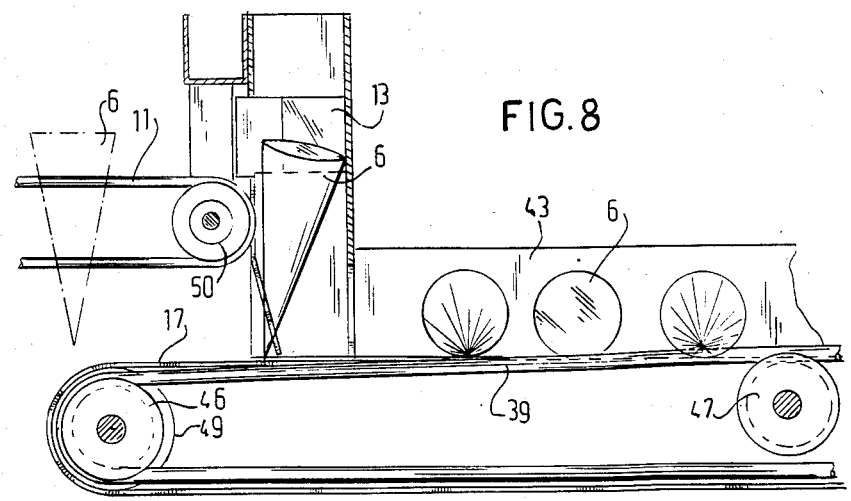

APPARATUS FOR PLACING CONES IN A BOX

The invention relates to the domain of arranging at least one layer of cones previously formed by a production apparatus, for example ice-cream cornets or filled paperbags in a box.

Hitherto it has been common practice for the cones delivered by the production apparatus to be manually picked by one or more members of the staff and placed in a standby box.

Such a method of filling boxes with cones has a few inconveniences. For example, in a manual process the speed of filling is necessarily limited. Moreover, human error can never be excluded, particularly in monotonous work such as the job concerned. This may be a source of disturbances which further adversely affect the production rate. When filling boxes with ice cream a further problem is involved in that the delivered ice cream has a very low temperature so that it is highly disagreeable to work with bare hands. Working with insulating gloves the operator loses the feel of contact between finger tips and product so that certainly after some time he may squeeze products or damage the same or drop them out of his hands.

In order to solve the above-described problems of the known technique the invention provides an apparatus for placing at least one layer of cones, for example, ice cream cornets or filled paperbags previously formed by a production apparatus and delivered in two groups in a box, said apparatus comprising two parallel, double, endless conveyor apparatus each consisting of two transport ropes driven with equal speeds and being spaced apart by a fixed distance, said ropes taking over the cones at equal intervals from the cone production apparatus in a manner such that the cones will hang vertically at equal distances between the two ropes of the respective conveying apparatus, guide members provided at the end of the pairs of transport ropes for depositing the cones supplied by one pair of ropes with their cone ends directed towards one side of the conveyor belt in horizontal positions and for depositing the cones supplied by the other pair of ropes with a phase difference of 180° with their cone ends directed towards the other side of the conveyor belt in a horizontal position thereon so that the cones alternately in opposite senses will lie transversely of the conveyor belt and a grab provided at the end of the conveyor belt for picking up from said belt a predetermined number of adjacent cones halted at an end stop and placing them in the standby box.

In order to obtain relatively off-set positions of the cones on the conveyor belt it is possible, when at equal time intervals two cones are supplied at a time to the apparatus by the production apparatus, to use conveyor apparatus driven with different speeds in a manner such that during their further transport the cones lag by half a cone distance with respect to the cones on the other conveyor apparatus. It is, however, preferred to use an apparatus embodying the invention to which at equal time intervals two cones are simultaneously supplied by the production apparatus, whilst the conveyor apparatus are driven with equal speeds, said apparatus comprising a deceleration apparatus co-operating with one conveyor apparatus and temporarily braking one by one the cones transported by said conveyor apparatus to an extent such that during their further transport these cones lag by half a cone distance with respect to the cones on the other conveyor apparatus. In this case the decelerating apparatus may consist of a guide strip of fixed length arranged at the side of one conveyor belt of the conveyor apparatus concerned, said guide strip pushing the passing cones away from the rope so that these cones will roll in rearward direction with respect to the other rope.

The invention is furthermore directed to an apparatus for most densily stacking cones in at least two layers in a box. Since the layers preferably comprise an even number of cones, whose distal head faces are parallel to one another, which minimizes the unused space, the stacked layers should occupy alternate positions in order to obtain a most dense stack in accordance with the alternate positions in each layer. Such a most dense stacking can be achieved by designing the grab in a manner such that it alternately picks up and places in the box a group of the required number of cones lying at the stop and a group of the same number of cones lying at a distance of an odd number of cones, for example, of one cone from said stop. A very practical embodiment has the particular feature that the grab is provided with a plurality of gripping members exceeding the number of cones of a group to be picked up and that the gripping members are energized so that the cones of the group in contact with the stop and the cones of the group spaced apart from the stop by one or another odd number of cones are simultaneously picked up and placed in the box. The important advantage of this embodiment is that the speed with which can be changed over from one to the other energization configuration is very high, which enhances the effective speed of the apparatus.

In general the grab is preferably provided with a number of gripping members formed by sucking cups.

In order to avoid disturbances in filling boxes having standing outwardly deflectable peripheral strips due to impact of cones on the strips, the apparatus is preferably provided with means for bending said peripheral strips to the outside to form a filling funnel.

It has been found that the group lying at the stop is stable with the exception of the last cone supplied. This cone is pressed by the driven conveyor belt against its predecessor, but it is at the same time exposed to a force by which it tends to roll back. This will be done with the peak of the cone as a centre. If the last cone has rolled away to an extent such that the cone arriving next can no longer correct its position, a disturbance may occur. In order to counteract said rolling in the opposite sense the conveyor belt may have a raised central zone. This raised central zone ensures satisfactory stability, since during a rolling movement of a cone of the kind described the centre of gravity of the cone gets upwards, which requires energy so that already after a slight rolling displacement a stable state of equilibrium is established.

In the case of a conveyor belt rigidly coupled with a raised central zone it is found that, when the cones are dropping on the conveyor belt, each cone rebounds a few times, which may be undesirable for given products and which does not guarantee a position in the desired sense. In order to exclude this risk the apparatus preferably has the feature that the conveyor belt is symmetrically divided, there being left free a central zone in which runs a rope driven with the same speed as the conveyor belt, the top surface of said rope being located below the top surface of the conveyor belt at the beginning of the active run of the conveyor belt and being located above the top surface of the conveyor belt along the further part of the active run of the conveyor belt.

The invention will now be described with reference to the accompanying drawing of an arbitrary embodiment. The drawing shows in FIG. 1 a plan view of a multiple apparatus embodying the invention, FIG. 2 a side elevation of the apparatus of FIG. 1, FIG. 3 a rear view of the apparatus of FIG. 1, FIG. 4 an elevational view taken on the line IV—IV in FIG. 1, FIG. 5 an elevational view taken on the line V—V in FIG. 1, FIG. 6 an elevational view taken on the line VI—VI in FIG. 1, FIG. 7 a plan view of a detail of the apparatus of FIG. 1, FIG. 8 an elevational view taken on the line VIII—VIII in FIG. 7 and FIG. 9 a perspective view of a grab for explaining the alternate, groupwise energization of the gripping members in filling a box with cones in densest possible stacks.

FIG. 1 shows a packing machine 1 comprising three apparatus 2, 3, 4 embodying the invention, each of which is connected with a production apparatus 5 for ice cream cornets 6.

The apparatus 2, 3 and 4 are substantial identical. Therefore, only the apparatus 3 will be described hereinafter.

The production apparatus 5 supplies the formed cones 6 to two parallel, double, endless conveyor apparatus 7, 8 comprising each two transport ropes 9, 10 and 11, 12 respectively driven with equal speeds and being spaced apart by a fixed distance, said ropes taking over the cones 6 with equal time intervals from the cone production apparatus 5 so that the cones will vertically hand at equal distances from one another between the two ropes of the respective conveyor apparatus 7, 8.

At the end of the pairs of transport ropes, 9, 10 and 11, 12 respectively are provided guide members 13, 14 to be described more fully with reference to FIGS. 7 and 8, which deposit the cones 6 supplied by the ropes 9, 10 with their top ends directed towards the side 16 of a conveyor belt 17 in horizontal positions and which deposit the cones 6 supplied with a phase difference of 180° by the other pair of ropes 11, 12 with their top ends directed towards the other side 15 of the conveyor belt 17 in horizontal positions so that in the manner shown in FIG. 1 the cones will lie in alternately opposite senses side by side transversely of the conveyor belt 17.

Figure 2:
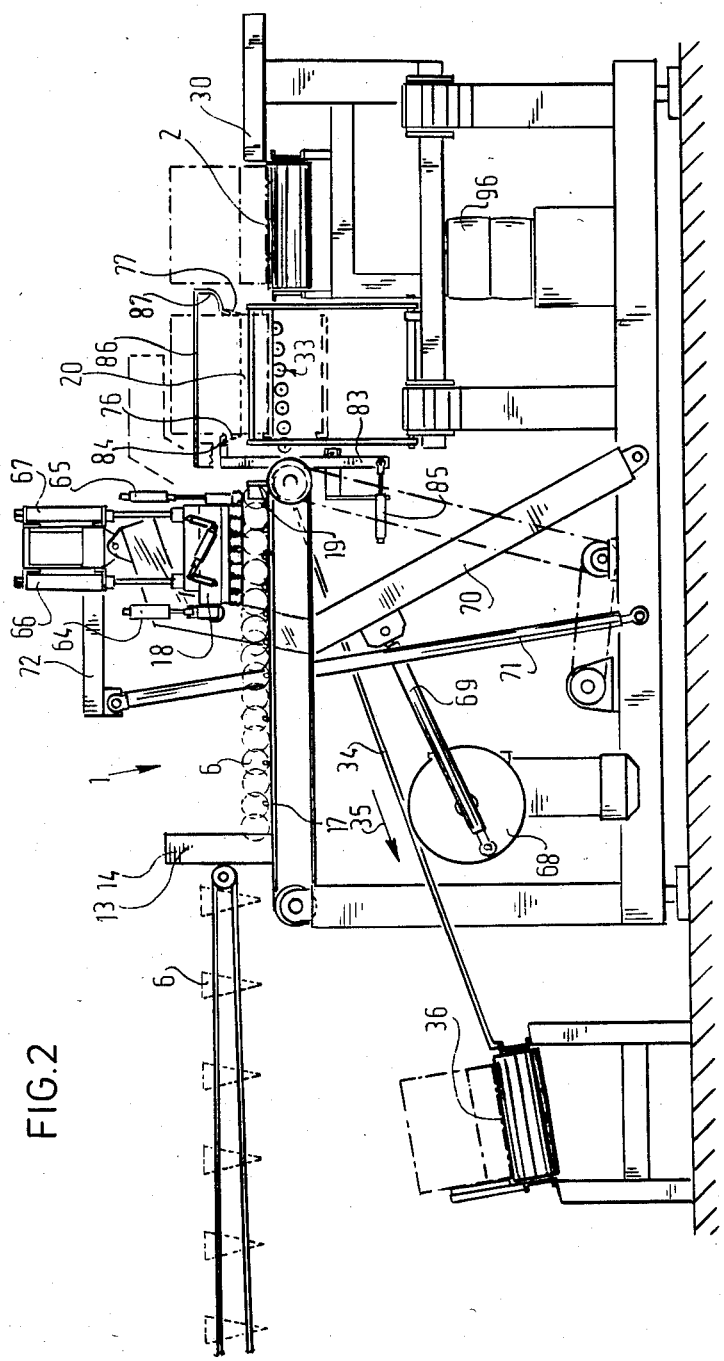
Figure 3:
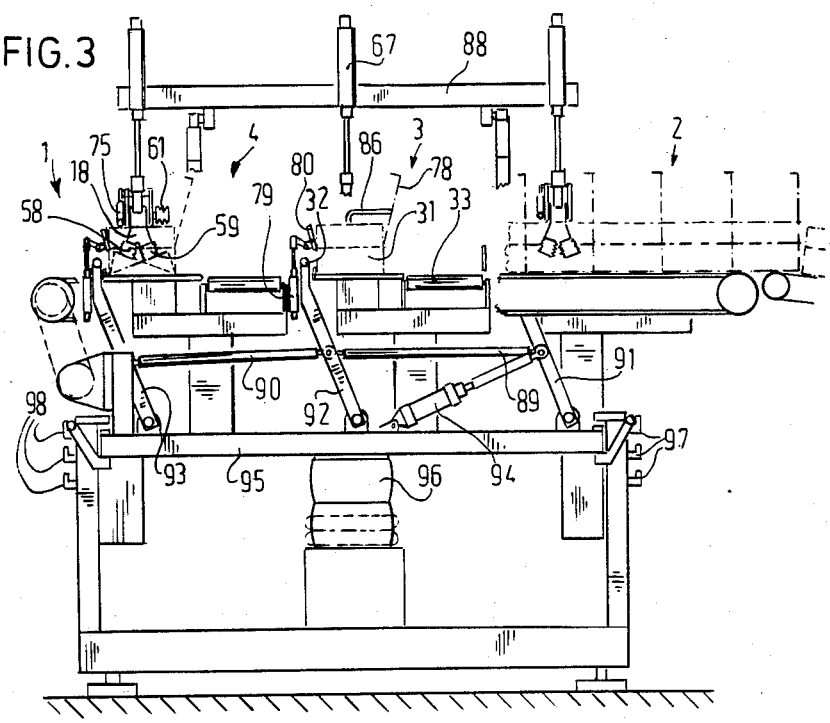

FIG. 2 shows furthermore a grab 18 arranged at the end of the conveyor belt 17, which grab picks up each time and places in a standby box 20 a predetermined number of adjacent cones coming to a standstill at an end stop 19, in the present case, eight cones from the conveyor belt 17.

The transport apparatus 7 and 8 are driven with equal speeds. At the side of the apparatus 7, that is to say on the other side of the transport rope 10, there is arranged a guide strip 21 serving as a delaying apparatus and pressing the passing cones 6 away from the rope 10 so that the cones will start rolling between the guide strip 21 and the rope 9. Since the cones 6 roll, with respect to the rope 9 along the length of the guide strip 21 in a relatively rearward direction, a delay is involved. The guide strip 21 has a length such that the cones transported by the apparatus 7 will lag by half a cone distance with respect to the cones 8 transported by the apparatus 8 during the further transport. This is illustrated in FIG. 1.

Figure 4:
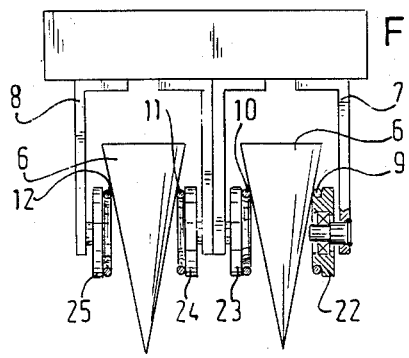
Figure 5:
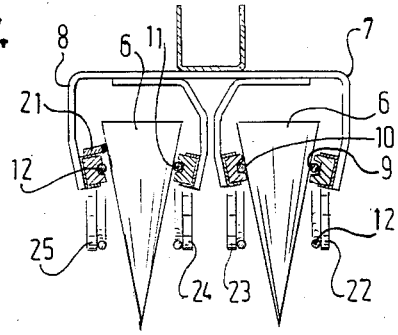

FIGS. 4 and 5 are respective views of the cones supplied by the production apparatus 5 and transported by the conveyor apparatus 7 and 8. The ropes 9, 10, and 11, 12 respectively are driven with equal speeds and run around rollers 22, 23 and 24, 25 respectively. It will be apparent that the guide strip 21 pushes the cone 6 away from the transport rope 12 so that obviously said cone starts a rolling movement as a result of which its translation speed becomes half the driving speed of the ropes 9, 10, 11, 12.

FIG. 1 furthermore shows a conveyor belt 26 for the supply of boxes 28 to be filled in the direction of the arrow 27. The boxes come to a standstill at an end stop 29 in a position such that the box directly in contact with the end stop 29 will come into line with the conveyor belt 17 of the apparatus 4. The relative pitch between the apparatus 2, 3, 4 is in this embodiment three times the width of a box 28 so that also to the apparatus 2, 3 boxes are supplied in corresponding positions.

A pressing member 30 pushes the box 28 towards a filling station 31, where the box 28 is filled by the grab 18 each time picking up eight cones 6 having come to a standstill at the end stop 19 and placing them layer-wise in the box 28 in a manner to be described more fully.

After a box is filled, it is removed by a pushing member 32 from the filling station 31 and moved to an inclined roller track 33, from where, sliding along a slide path 34, it is displaced towards a delivery conveyor belt 36 driven in the direction of the arrow 35.

The grab 18 is designed so that it alternately picks up a group of eight cones 6 lying at the end stop 19 and a group of eight cones spaced apart by the distance of one cone from said stop 19 and places them in the box 28. For this purpose the grab 18 is provided with nine suction cups serving as gripping members connected with a source of subatmospheric pressure, the suction cups being energized so that alternately the eight cones of the group in contact with the stop 19 and the cones of the group spaced apart therefrom by one cone are simultaneously picked up and placed in the box. The construction and the operation of the grab 18 will be further described with reference to FIG. 9.

FIG. 6 shows the conveyor belt 17. This belt comprises two symmetrical runs 37, 38, between which a rope 39 protrudes, which is driven with the same speed. The cones are lying on the conveyor belt in the position shown. As stated above, the tendency of the hindmost cone transported to start rolling is counteracted since by this rolling movement the centre of gravity moves upwards, which requires energy as a result of which a state of equilibrium of forces establishes.

The runs 37, 38 are guided around rollers 40 and 41 respectively. At the side of the cones to be transported there are standing walls 42, 43.

When the cones would drop on a part of the belt 17 of the construction shown in FIG. 6, rebounds would occur so that a correct position could not be ensured and even disturbances might occur. With regard thereto the rope 39 is running lower at the beginning of the conveyor belt 17 so that its top surface is located below the top surface of the runs 37, 38. This is illustrated in FIG. 8. The guide members 13, 14 to be further described cause the cones 6 to drop on the place where the rope 39 is still at a lower level so that without rebounds the cones 6 reach a stable, off-set position as illustrated in FIGS. 7 and 8.

FIG. 7 shows the guide members 13, 14. They are formed by vertical plates in inclined position at the end of the pairs of ropes 9, 10 and 11, 12 respectively. The guide member 13 co-operates with the broad part (the broad bottom surface away from the top of the cone) of the cones 6 so that the bottom surface drops in the direction towards the side 15 of the conveyor belt 17. Mutatis mutandis the same applies to the guide member 14, which imparts such a movement to the cones 6 supplied by the ropes 11, 12 that their broad bottom surface gets in the direction towards the side 16 of the conveyor belt 17.

FIG. 8 is a view taken on the line VIII—VIII in FIG. 7. After the discussion of FIG. 7 a detailed explanation of FIG. 8 may be omitted. Reference is made to the presence of reversing rollers 44, 45 for the runs 37 and 38 respectively. The rope 39 passes around a reversing roller 46 coaxial with the former rollers, but having a smaller, effective diameter than the rollers 44, 45 so that at the beginning of the effective run of the conveyor belt 17 the rope 39 lies at a lower level. A roller 47 lies higher than the roller 46 to an extent such that the rope 39 gets at a higher level than the runs 37, 38. This higher position is maintained up to the end of the conveyor belt 17. The ropes 9, 10, 11, 12 pass around reversing rollers 48, 49, 50, 51.

FIG. 9 shows the grab 18 comprising a block 52 with seven fixed suction cups 53, 54, 55, 56, 57, 58, 59 as well as two suction cups 60 and 61 alternately brought into an active and an inactive position. FIG. 9 shows that the suction cups 53 to 61 are arranged in a zigzag pattern. The suction cups 60 and 61 are coupled with a block 62, 63 respectively pivotally coupled with the block 52. The displacement occurs by the alternating energization of pneumatic cylinders 64, 65.

It will be obvious that, when going over from one layer to the next layer to be placed in the box 20 the stroke of the block 52 has to be changed by a distance equal to the distance between two successive suction cups in the direction of displacement.

After the grip 18 has picked up a group of eight cones with the aid of the suction cups 53 to 59 and the suction cup 60 or 61 it is displaced upwards by pneumatic cylinders 66, 67, after which being driven by a brake motor 68 through a connecting rod 69 it performs a substantially horizontal movement as far as above the opened box 20, after which by opposite energization of the cylinders 66, 67 the block 52 drops, the energization of the suction cups is obviated and the cones are lowered into the box concerned. This onward displacement is indicated by the broken arrows 73. The reverse displacement is marked by the solid arrows 74.

During the onward and reverse displacements the adaptation of the stroke takes place every other cycle by energizing or de-energizing a pneumatic cylinder 75, which can displace the block 52 through a rod mechanism over the pitch distance between two successive suction cups. Moreover, during the reverse displacement one of the two suction cups 60, 61 is brought into its active position and the other out of its active position by energizing and de-energizing respectively the cylinders 64, 65.

Since in filling boxes of relatively narrow size a slight lateral displacement of the cones may give rise to disturbances, the lateral flaps 76, 77 and the cover 78 of the box 20 are slightly bent outwards at the filling station 31 to form a filling funnel. By energizing a pneumatic cylinder 79 shown in FIG. 3 an additional, inclined guide plate 80 is moved towards the free edge 81 of the box 20 so that the lateral flaps 76, 77, the cover 78 and the guide plate 80 together constitute a filling funnel for disturbance-free filling of the box.

For the outward deflection of the lateral flap 76 directed towards the conveyor belt 17 a hook 84 arranged on a lever 83 is used. When a pneumatic cylinder 85 is energized, the hook 84 engages the flap 76 of the box 20 arriving at the filling station 31 and moves the same into the position shown in FIG. 2. When a box 20 is pushed towards the filling station 31 by the energization of the pushing member 30, the lateral flap 77 comes into contact with the foremost part 87 of the cover opening member 86 so that the lateral flap 77 gets into the inclined position shown in FIG. 2. An inclined part 98 of the member 86 moves the cover 78 into the inclined position shown in FIG. 3 during said pushing movement. In conjunction with the above-mentioned guide plate 80 to the lateral flaps 76, 77 and the cover 78 thus form a filling funnel through which the cones can be readily placed in the box 20.

As stated with reference to FIG. 1 the packing machine 1 comprises three apparatus 2, 3, 4 embodying the invention. As will be particularly apparent from FIGS. 1 and 3, the grabs 18 of the respective apparatus 2, 3, 4 are carried by a beam 88 in a manner such that the three grabs 18 are invariably displaced exactly simultaneously.

The pushing members 32 of the three apparatus 2, 3, 4 are coupled with one another in an analogous manner by levers 91, 92, 93 coupled with one another by rods 89, 90 for identical movements, said levers carrying the pushing members 32 at their free top ends. A pneumatic cylinder 94 is coupled with the lever 91 for putting the pushing members 32 into and out of operation.

The levers 91, 92, 93 and the fixed end of the cylinder 94 are pivotally carried by a table 95, the effective height of which can be adjusted in dependence on the height of the boxes and the cones to be placed therein by means of an adjusting member 96 in conjunction with locking elements 97, 98.

It should be noted that the invention is not limited to the embodiment described and illustrated.

For example, a different number of suction cups may be put into and out of an active position in order to permit of choosing, within given limits, the number of products to be arranged in each layer in the box.

No reference is made to means for closing the filled box. Such means are, however, within the scope of one skilled in the art.

The control-means for the synchronous control of the various units in accordance with a desired cycle are not illustrated or described either. Reference is furthermore made to the various possibilities of the designer to ensure that at the de-energization of the grab 18 the cones will drop only from a small height on the bottom of the box or on the layer placed earlier. For example, one or more sensors may be used, whilst a central control-unit can apply fixed, corresponding instructions to the pneumatic cylinders 76, 77.

I claim:

1. A system for packaging generally conical articles, each having an enlarged top and a narrow tip, from a two row feed thereof, in which the articles are suspended with their tops uppermost, into a single horizontal row arrangement in which the articles lie horizontally in top-to-tip relation, and for transferring the articles as a layer of contiguous articles in said top-to-tip relation into a receptacle therefor, which comprises:

feed means for feeding the articles from two side-by-side vertical rows thereof, in which each vertical row is comprised of a spaced succession of the articles suspended with their enlarged tops disposed uppermost, sequentially into said single horizontal row arrangement;

conveyor means for receiving the articles in said single horizontal row arrangement and in spaced succession conveying them along a path as said single horizontal row arrangement thereof;

stop means in the path of said single horizontal row arrangement for causing said articles sequentially to be grouped into a contiguous sequence thereof in said top-to-tip relation; and transfer means for transferring a plurality of articles from said contiguous sequence thereof into a receptacle therefor.

2. A system as defined in claim 1 wherein said feed means includes guide means for depositing the articles of the vertical rows in said single horizontal row arrangement on said conveyor means with the enlarged tops of the articles from one vertical row to one side of said conveyor means and the enlarged tops of the articles from the other vertical row to the other side of the conveyor means so that said single horizontal row arrangement is formed with adjacent articles in top-to-tip relation, and two pairs of spaced belts in which each pair of belts suspends one of said vertical rows of articles.

3. A system as defined in claim 1 or 2 wherein said feed means also includes phasing means operative in connection with one of said vertical rows for assuring that the sequence of articles from said one of the vertical rows is deposited on said conveyor means out of phase with respect to the sequence of articles deposited on said conveyor means from the other vertical row so as to form said single horizontal row arrangement.

4. A system as defined in claim 3 wherein said phasing means comprises a guide strip of predetermined length positioned to intercept and temporarily slow the travel of each article conveyed in said one vertical row.

5. A system as defined in claim 2 wherein said feed means also includes phasing means operative in connection with one of said vertical rows for assuring that the sequence of articles from said one of the vertical rows is deposited on said conveyor means out of phase with respect to the sequence of articles deposited on said conveyor means from the other vertical row so as to form said single horizontal row arrangement, said phasing means comprising a guide strip of predetermined length positioned adjacent one belt of said feed means to disengage each article temporarily from said one belt and thereby intercept and temporarily slow the travel of each article conveyed by said one belt.

6. A system as defined in claim 1 or 2 wherein said transfer means comprises a pick-up head having a plurality of pick-up means thereon equal to one more than the plurality of articles transferred, two of said pick-up means being alternately used during successive transfers whereas the remainder of the pick-up means are used during each transfer so that two nested layers of articles may be deposited into a receptacle.

7. A system as defined in claim 6 wherein said conveyor means includes a raised central zone so that the articles supported thereby are disposed with their axes substantially coplanar.

8. A system as defined in claim 7 wherein said conveyor means comprises a pair of spaced, parallel belts defining a support surface lying in a common plane and a further belt disposed between said spaced, parallel belts and presenting a support surface above said common plane to define said raised central zone.

9. In a system for packaging generally conical articles each having an enlarged top and a narrow tip, the combination of:

conveyor means for conveying the articles along a common path with the articles lying on their sides in a spaced sequence aligned in said path in which serially successive articles are disposed in top-to-tip relation;

stop means in said path for causing said spaced sequence of articles sequentially to be grouped into a contiguous sequence thereof in said top-to-tip relation; and transfer means for transferring a group of articles having a particular orientation relative to said conveyor means from said contiguous sequence as a layer of articles in a receptacle therefor.

10. In a system as defined in claim 9 wherein said transfer means also transfers a second group of articles having a second orientation relative to said conveyor means from said contiguous sequence as a second layer nested with said layer first mentioned.

11. A system as defined in claim 10 wherein said conveyor means includes a raised central zone so that the articles supported thereby are disposed with their axes substantially coplanar.

12. A system as defined in claim 11 wherein said conveyor means comprises a pair of spaced, parallel belts defining a support surface lying in a common plane and a further belt disposed between said spaced, parallel belts and presenting a support surface above said common plane to define said raised central zone.

13. In a system as defined in claim 9 or 10 wherein said transfer means comprises a pick-up head having a plurality of pick-up means thereon equal to one more than the plurality of articles transferred, two of said pick-up means being alternately used during successive transfers whereas the remainder of the pick-up means are used during each transfer so that two nested layers of articles may be deposited into a receptacle.

14. In a system for packaging generally conical articles each having an enlarged top and a narrow tip, the combination of:

conveyor means for conveying the articles along a common path with the articles lying on their sides;

first and second feed means for feeding articles alternately from two adjacent rows of articles and depositing them on said conveyor means to form a row of aligned articles in spaced sequence in which successive articles are in top-to-tip relation;

stop means in said path for causing said spaced sequence of articles sequentially to be grouped into a contiguous sequence thereof in said top-to-tip relation; and transfer means for transferrring a group of articles having a particular oreintation relative to said conveyor means from said contiguous sequence as a layer of articles to a receptacle therefor.

15. In a system as defined in claim 14 wherein said transfer means also transfers a second group of articles having a second orientation relative to said conveyor means from said contiguous sequence as a second layer nested with said layer first mentioned.

16. A system as defined in claim 14 or 15 wherein said transfer means comprises a pick-up head having a plurality of pick-up means thereon equal to one more than the plurality of articles transferred, two of said pick-up means being alternately used during successive transfers whereas the remainder of the pick-up means are used during each transfer so that two nested layers of articles may be deposited into a receptacle.

17. A system as defined in claim 16 wherein said conveyor means includes a raised central zone so that the articles supported thereby are disposed with their axes substantially coplanar.

18. A system as defined in claim 17 wherein said conveyor means comprises a pair of spaced, parallel belts defining a support surface lying in a common plane and a further belt disposed between said spaced, parallel belts and presenting a support surface above said common plane to define said raised central zone.

* * * * *